(No Model.) 4 Sheets—Sheet 1.

C. RAAB.
ELECTRIC METER.

No. 514,131. Patented Feb. 6, 1894.

WITNESSES:
E. B. Bolton
E. W. Sturtevant

INVENTOR
Carl Raab
BY
[signature]
ATTORNEYS (No Model.) 4 Sheets—Sheet 2.

C. RAAB.
ELECTRIC METER.

No. 514,131. Patented Feb. 6, 1894.

WITNESSES:
C. B. Bolton
E. K. Sturtevant

INVENTOR
Carl Raab
BY
ATTORNEYS

THE NATIONAL LITHOGRAPHING COMPANY,
WASHINGTON, D. C.

(No Model.) 4 Sheets—Sheet 3.

C. RAAB.
ELECTRIC METER.

No. 514,131. Patented Feb. 6, 1894.

Witnesses:
E. B. Bolton
E. W. Sturtevant

INVENTOR
Carl Raab
BY
ATTORNEYS (No Model.) 4 Sheets—Sheet 4.
C. RAAB.
ELECTRIC METER.
No. 514,131. Patented Feb. 6, 1894.
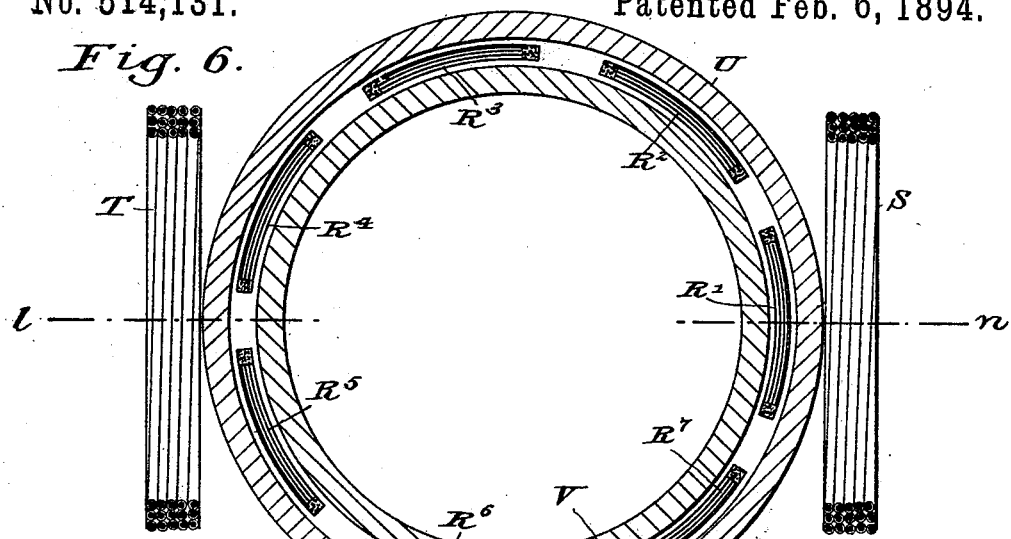
Fig. 6.
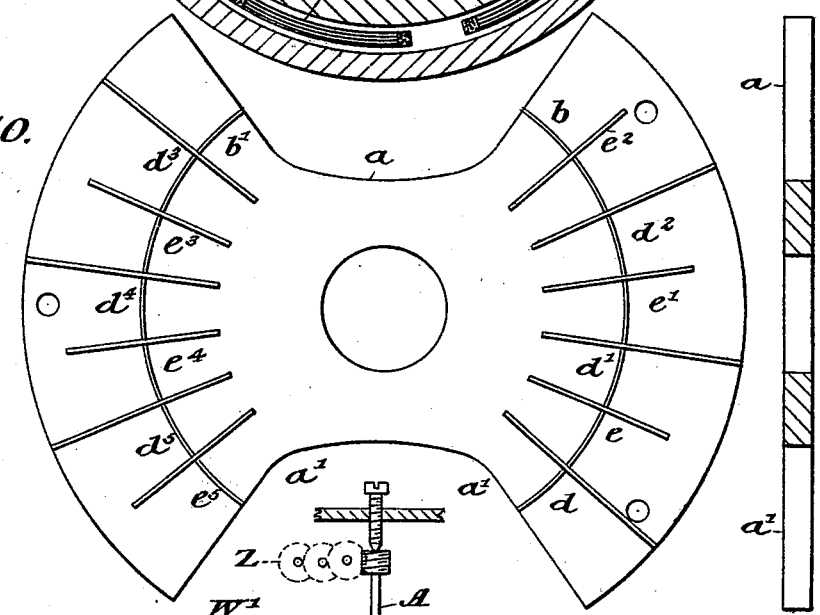
Fig. 10.
Fig. 11.
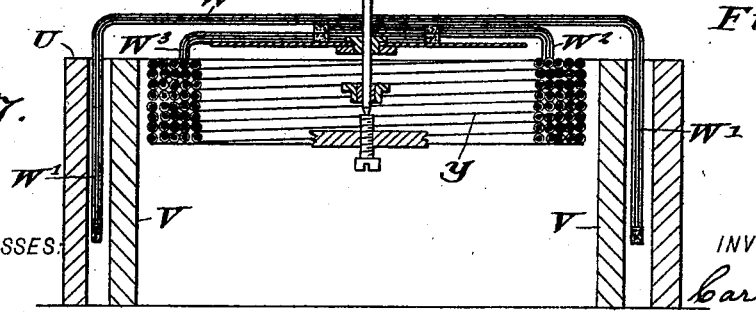
Fig. 7.
WITNESSES:
E. B. Bolton
E. K. Sturtevant
INVENTOR
Carl Raab
BY
Reynolds
ATTORNEYS

UNITED STATES PATENT OFFICE.

CARL RAAB, OF KAISE SLAUTERN, GERMANY.

ELECTRIC METER.

SPECIFICATION forming part of Letters Patent No. 514,131, dated February 6, 1894.

Application filed January 21, 1893. Serial No. 459,305. (No model.)

*To all whom it may concern:*

Be it known that I, CARL RAAB, a subject of the Emperor of Germany, and a resident of Kaiserslautern, Palatia, Germany, have invented new and useful Improvements in Electric Meters, of which the following is a specification.

This invention relates to electric meters comprising an electro-motor which actuates a counting train and an electro-dynamic damping or retarding device which absorbs the surplus power of the motor.

The motor and damper are usually separate, and the invention has for its object to simplify the construction of the meter by making the rotating armature a component part of both the motor and the damping or retarding device, the armature revolving in a stationary magnetic field set up by the current to be measured, the surplus power being neutralized by a surrounding upper casing.

Reference is to be had to the accompanying drawings, forming part of this specification, wherein—

Figure 1:
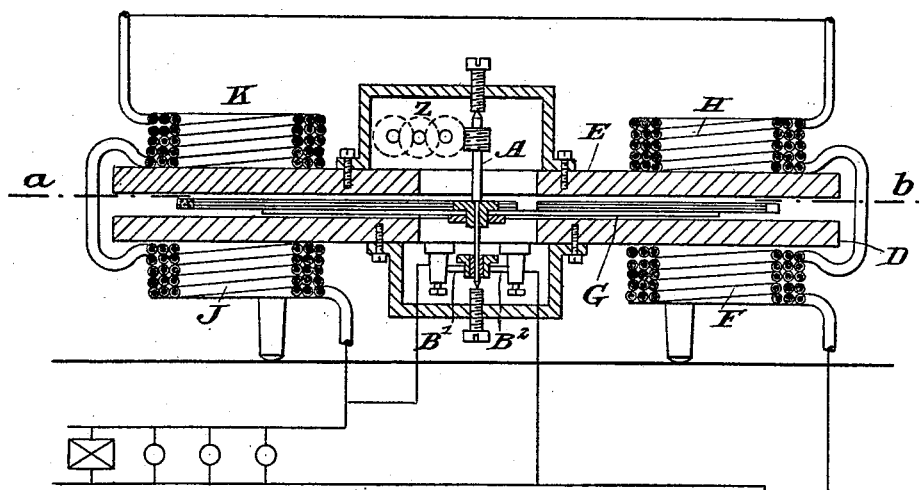
Figure 2:
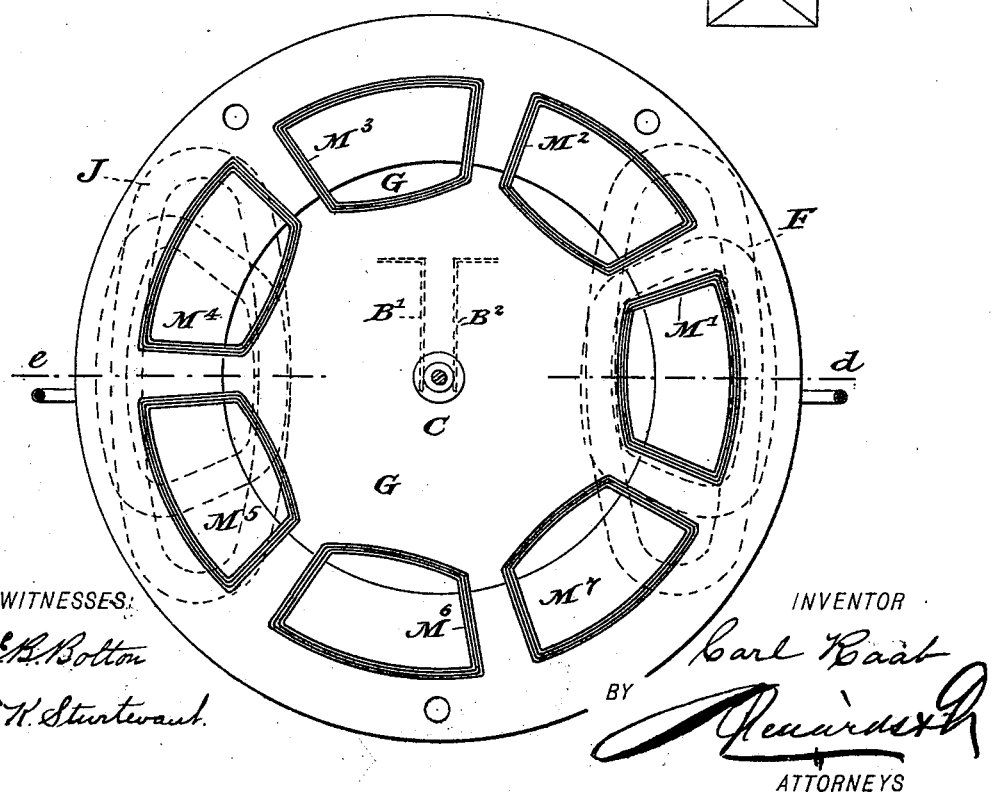

Figure 1, shows a vertical section of one form of meter, on line $e$—$d$ of Fig. 2, and Fig. 2, is a horizontal section on line $a$—$b$ of Fig. 1. Figs. 3, 4, 5, 6, 7, 8 and 9 show various modifications. Fig. 10, is a side view, and Fig. 11, a sectional view of a modified form of copper plate adapted to an alternating current machine.

A, is the spindle of the revolving armature comprising the fine wire coils $M'$ to $M^7$, carried by mica disks G, and connected with a commutator C, in the manner of the Gramme armature. The armature coils $M'$ to $M^7$ have a high resistance, are constructed of many convolutions and are placed in a shunt to the main circuit so that they are traversed by a weak constant current. The armature revolves between two fixed copper disks D, and E, and stationary solenoid coils F, H, J, K, traversed by the current to be measured. The armature coils $M'$ to $M^7$ are switched into two parallel groups in the known way by the commutator C, and brushes $B'$ and $B^2$, and the latter are so placed that the current of every coil of the armature is commutated when it is situated centrally between the coils H, F, or the coils K, J, so that the coils F, H, attract those armature coils that are repelled by the coils K, J, and conversely the coils F, and H, repel those armature coils that are attracted by the coils K, J, whereby the armature is revolved and actuates the counting train Z, with which its spindle is geared. When the armature is in the position shown in Fig. 2, the coils F, and H, attract the armature coils $M^5$, $M^6$, $M^7$, and repel $M^2$, $M^3$, $M^4$, whereas the coils K and J, attract $M^2$, $M^3$, $M^4$, and repel $M^5$, $M^6$ and $M^7$. At this moment the armature coil $M'$ is short circuited. Directly the armature coils move their lines of force generate unipolar currents in the copper disks D, and E, whereby the surplus power of the motor remaining after the friction of the mechanism has been overcome, is absorbed.

The modification shown in Figs. 3 to 9 differ from the meter shown in Figs. 1 and 2, chiefly in the mechanical arrangement of the motor and of the electro-dynamic damping or retarding device.

Figure 3:
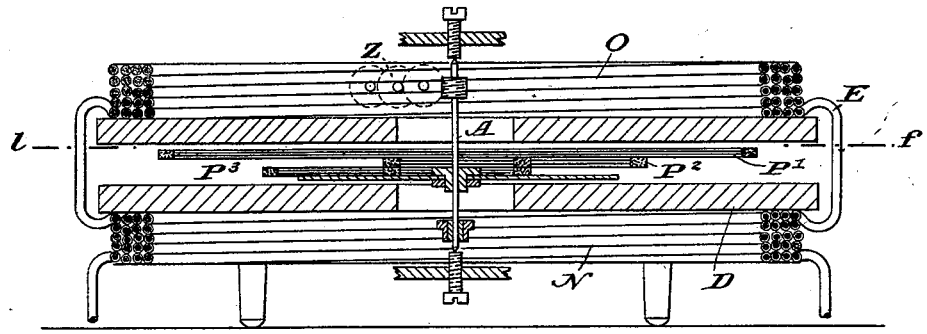
Figure 4:
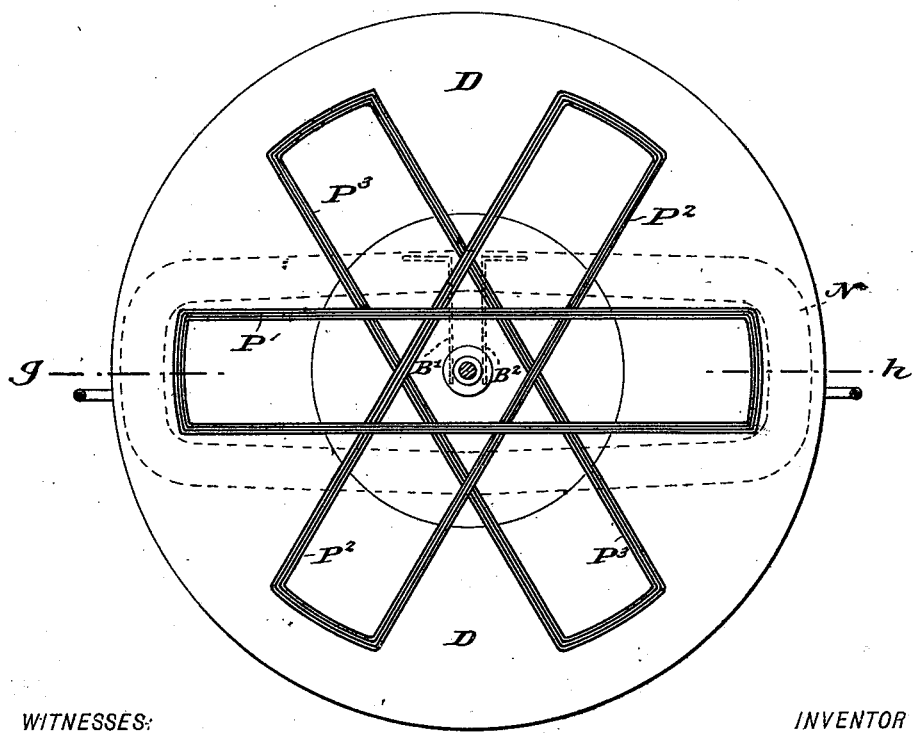

The armature in Figs. 3 and 4, consists of crossed coils $P'$, $P^2$, $P^3$, fixed to the spindle A, by means of the mica disk G, and are connected with commutator C, after the manner of the Hefner-Alteneck armature.

D, E, are the copper damping disks and N, O, the solenoid coils which are traversed by the main current and set up the stationary magnetic field.

Each armature coil is short-circuited and its current commutated directly it arrives at the center of the magnetic field of the coils N, O. At the moment when the armature is in the position shown in Fig. 4, its coil $P'$ is short circuited while $P^2$, and $P^3$, are turned to the left by the coils N and O.

Figure 5:
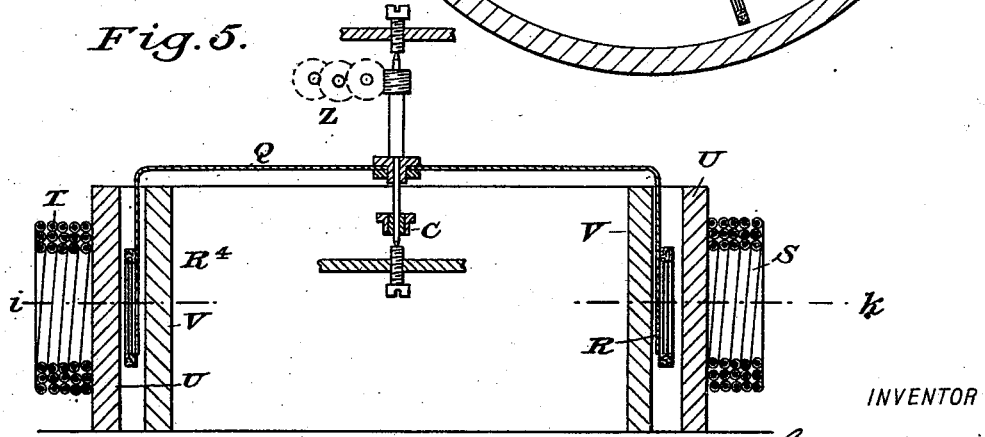

Instead of the armature coils being in a plane perpendicular to their axes of rotation, as in Figs. 1 to 4, they may be arranged as at $R'$, to $R^7$, Figs. 5 and 6, collectively in the form of a cylinder concentric with the axis A, to which they are rigidly connected by means of the drum Q, the ends of the coils being connected to the commutator C, after the manner of the Gramme armature. The coils of the armature revolve between the copper cylinders U, V, outside of which the coils S, and T, traversed by the main current are arranged in planes parallel to the axis A, the operation being similar to that described in reference to Figs. 1 and 2.

In Fig. 7, the armature coils W', W², W³, are formed by prolonging and bending down the coils P', P², P³, of Figs. 3, and 4, at right angles to the plane of the armature. The electric motor is constituted on the same principle as that shown in Figs 3 and 4 the stationary magnetic field being set up by means of coil Y, the surplus power being absorbed by the generation of unipolar currents by the bent down ends of the armature coils W', W², W³, rotating between the copper cylinders U and V.

The motor shown in Fig. 7, differs from those previously referred to, in that part only of the armature which is opposite to the coil Y, acts as a component of the electric motor, while the bent down part serves only for the electro-dynamic damping or retarding device.

Figure 8:
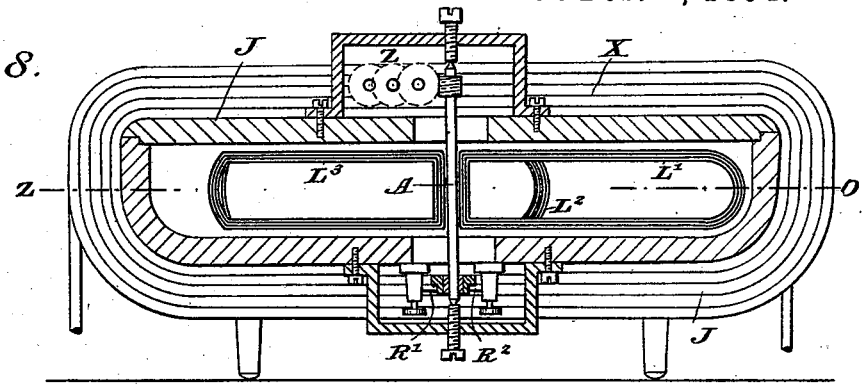
Figure 9:
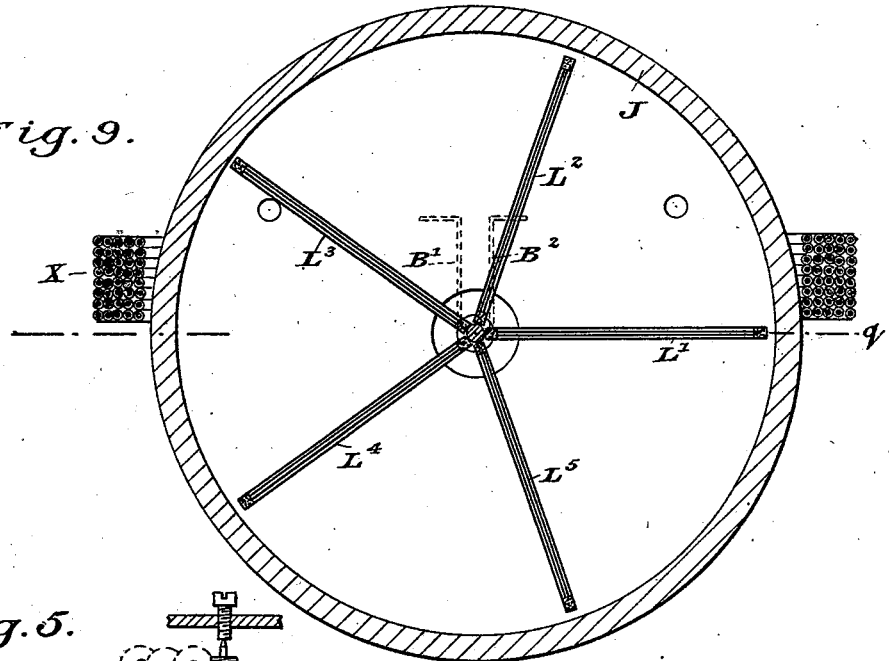

The armature shown in Figs. 8 and 9 is an ordinary Gramme armature consisting of fine wire coils L', L², L³, L⁴, L⁵, radial to the axis of rotation. The armature is inclosed in the copper casing J, for absorbing the surplus power of the motor and which is in turn surrounded by the coil X, which is traversed by the main current. If the ordinary Hefner-Alteneck armature which consists of crossed coils running both parallel and radial to the axis of rotation be substituted for the Gramme armature shown in Figs. 8 and 9, the coil X, will be unaltered.

Various alternative arrangements of the coils traversed by the main current may be adopted. For instance, with the meter shown in Figs. 1 and 2, the coils F, H, K, J, may be switched parallel to one another or individually removed. The same remark applies to the coils N and O shown in Figs. 3 and 4.

With the meter shown in Figs. 5 and 6, another thick wire coil can be arranged within the copper cylinder V. Such modifications do not, however, involve any difference in principle because all these coils are to be regarded as simple electric conductors by means of which the main current generates the stationary magnetic field.

Instead of using copper for the disks or cylinders wherein the rotating armature generates unipolar currents other electric conductors may be used for instance, aluminium, and the form may be varied instead of being disks and cylinders, and furthermore, parts of the copper casing as for instance, the disk D, or E, shown in Figs. 1 and 2, can be removed as it is not necessary that the armature should be inclosed in copper but only that its lines of force should cut fixed copper masses.

When employing the apparatus for measuring alternating currents only divided copper masses within the influence of the armature and the fixed coils can be used as both the armature coils on the one hand and the fixed coils on the other would set up induction currents in the copper masses between them at the expense of the unipolar currents. The generation of induction currents through the fixed coils may be obviated in another way, viz., by entirely removing the copper masses from the influence of the stationary coils. Such an arrangement is shown in Figs. 10 and 11 where the disks D, E, shown in Figs. 1, and 2, have large gaps $a$, and $a'$ so that the coils F, H, and J, K, Figs. 1 and 2, (which in this case have preferably the altered form shown in dotted lines in Fig. 2) will have no inductive action on said disks. The same object will be fulfilled by dividing the copper masses by simple slits and at the same time the inductive capacity of the armature coils M' to M⁷ will be checked. These slits are shown in Fig. 10. They may be disposed peripherally as at $b$, $b'$ or radially as at $d$, $d'$, $d^2$, $e$, $e'$, $e^2$. By this means it is possible to entirely obviate the production of induction currents in the fixed copper disks without sensibly interfering with the generation of unipolar currents. If the copper disks with gaps $a$, $a'$ shown in Figs. 10 and 11 are employed, those parts of the armature situated opposite the gaps $a$, $a'$ only act as motor and the remaining parts of the armature only for electrodynamic damping or retarding. This double function differs from that of the arrangement shown in Fig. 7, in that the individual coils M' to M⁷ serve alternately the purposes of motor and damper or brake, whereas in Fig. 7, a part of the armature W', W², W³, serves continuously as motor and the other part as damper.

I claim—

1. In electric motor meters, the combination of a revoluble armature lying in a shunt and consisting of solenoids, solenoids comprising the magnetic field and a damping disk, substantially as described.

2. In electric motor meters, the combination of an armature lying in a shunt and consisting of solenoids, the field solenoids and the stationary damping disk located between the field solenoids and the armature solenoids, substantially as described.

3. In combination in electric motor meters the disk shaped armature lying in a shunt and consisting of solenoids the field solenoids and the damping disk on both sides of the disk shaped armature, substantially as described.

In testimony whereof I have signed my name to this specification in the presence of two subscribing witnesses.

CARL RAAB.

Witnesses:
 FRIEDRICH CÖRRELL,
 ALVESTO S. HOGUE.